UNITED STATES PATENT OFFICE.

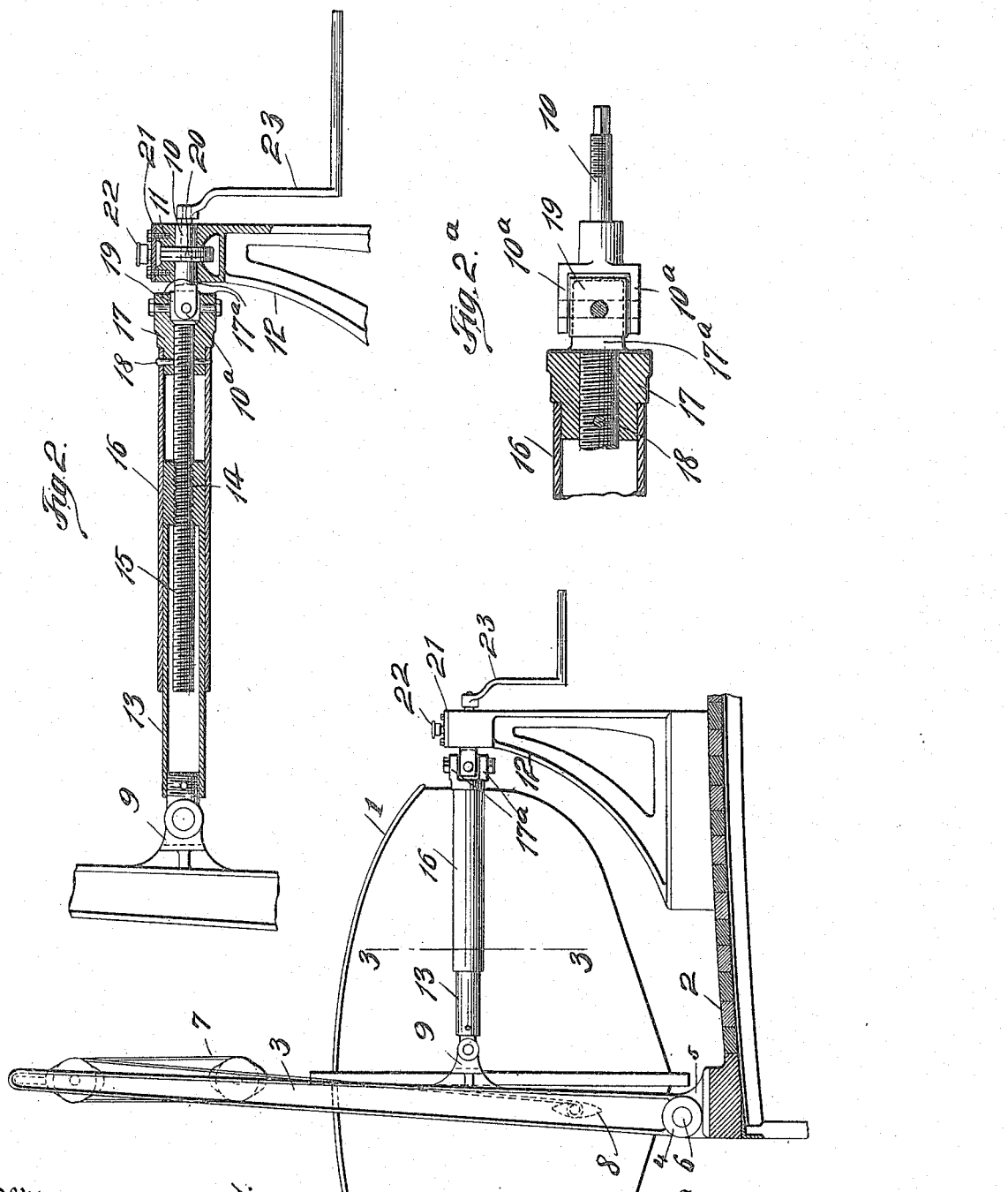

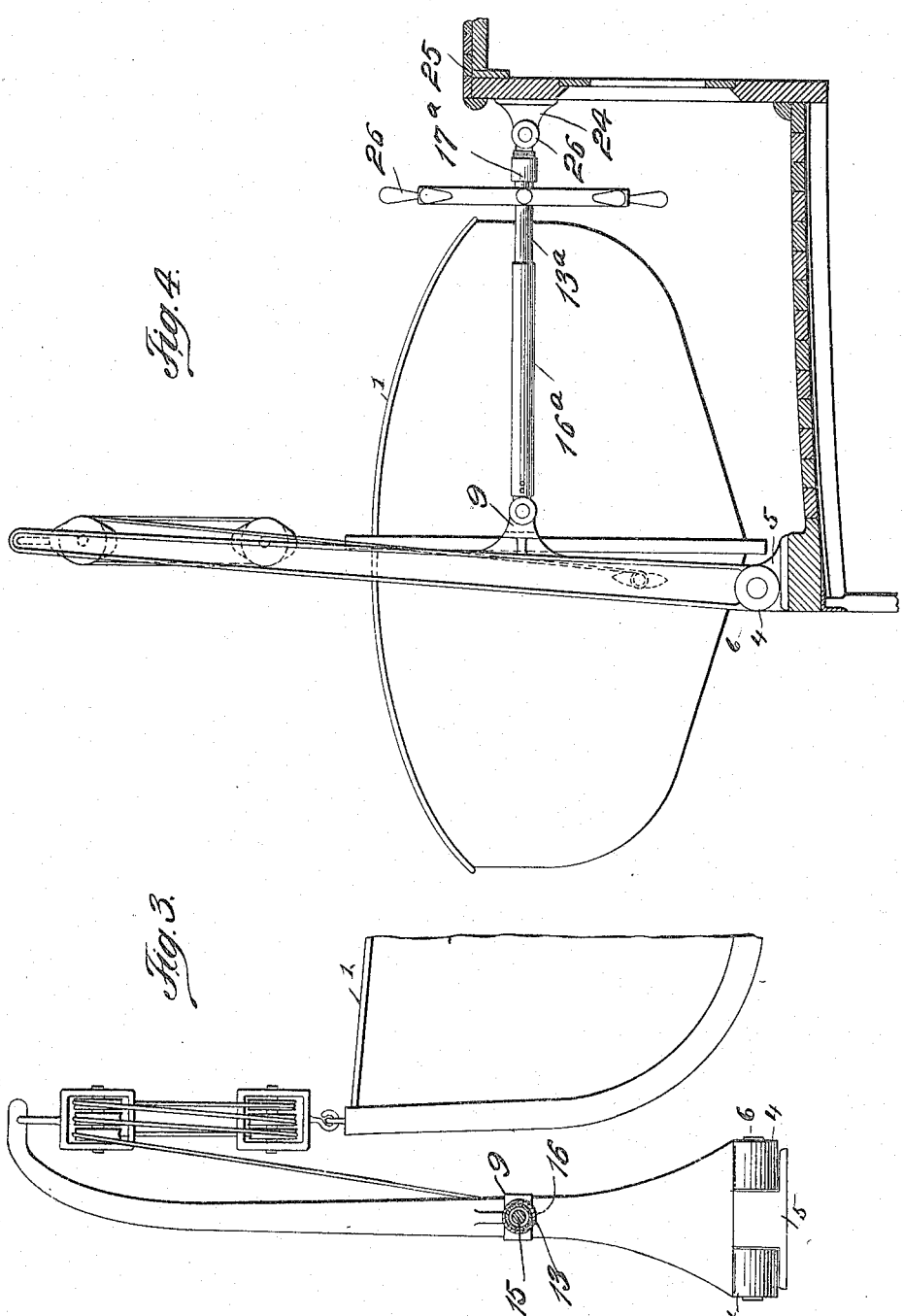

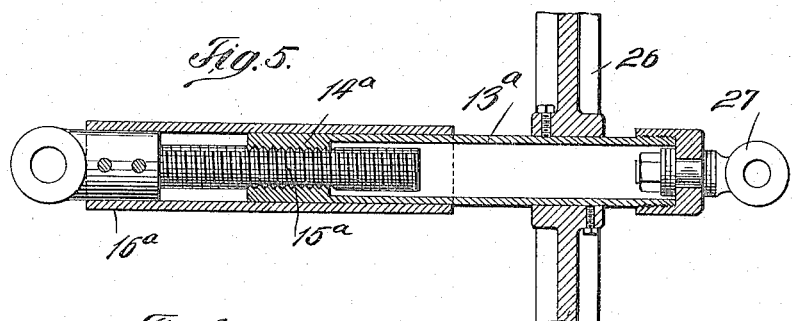
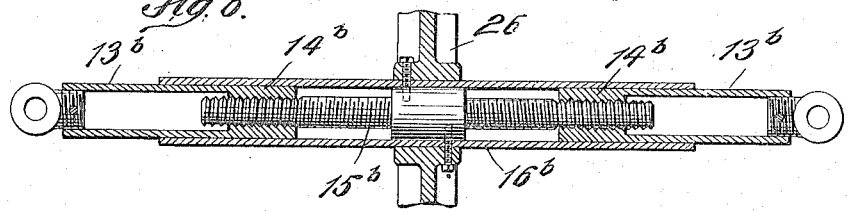
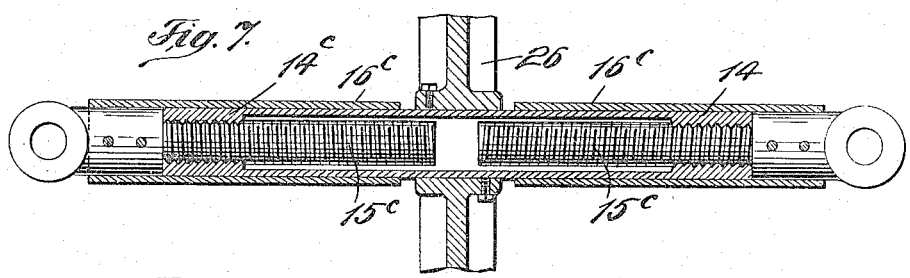
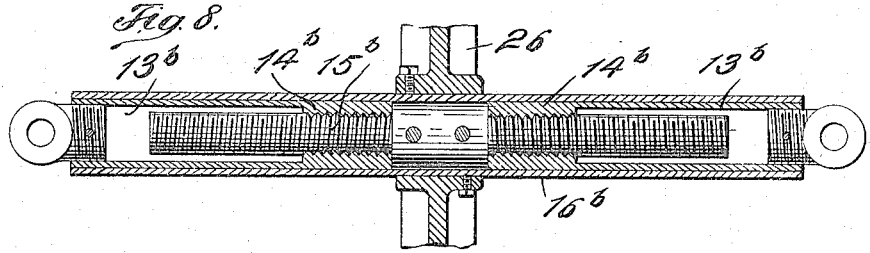
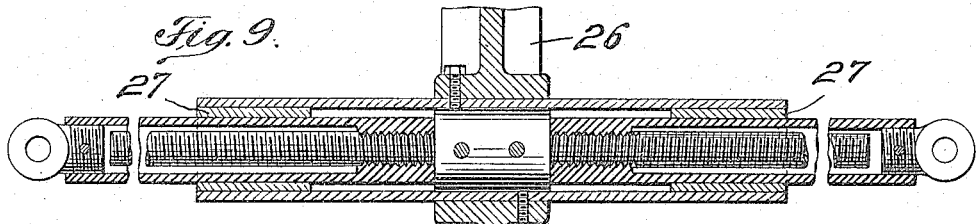

HARRY W. BROADY, OF BAYSIDE, NEW YORK, ASSIGNOR TO ANDREAS P. LUNDIN, OF BAYSIDE, NEW YORK.

DAVIT FOR RAISING AND LOWERING SHIPS' BOATS.

1,128,845.          Specification of Letters Patent.      Patented Feb. 16, 1915.

Application filed January 8, 1913. Serial No. 740,808.

*To all whom it may concern:*

Be it known that I, HARRY W. BROADY, a citizen of the United States, and a resident of Bayside, borough of Queens, county of Queens, and State of New York, have invented certain new and useful Improvements in Davits for Raising and Lowering Ships' Boats, of which the following is a specification.

This invention relates to improvements in davits for raising and lowering ships' boats, and is an improvement on the type of davit in which the means for actuating the davit to swing comprises unsupported interconnected screw and nut members, one connected to the davit and the other to the vessel.

In devices of the type referred to, I have found that the parts lack rigidity, and that during actuation and especially when the parts of the actuating mechanism for swinging the davit are under compression, the screw is subjected to a bending strain, and if the nut and screw are closely associated a binding between the parts will occur, especially while such parts are under compression, and furthermore the aforesaid bending strain is likely to injure or destroy the screw threads.

By the use of my present invention, the screw is relieved from all bending strain and bearing stresses whatsoever, the screw and nut being guided to move relatively to each other in all positions of the davit, and furthermore the screw and nut are at all times during actuation completely inclosed and thus protected from the weather, thus permitting a screw of steel or other suitable material to be employed instead of the bronze screws heretofore necessarily employed.

Another feature of my invention comprises means whereby one of the interconnected members may be revolved by means of an actuating shaft having rotary movement only, thus eliminating the usual swiveled bearing which changes the arc of rotation of the crank, compels the operator to continually change his position during the turning of the crank or other actuating device, and by the use of which bearing the pressure exerted by the operator on the crank or other device to turn the same tends to cause a bending strain between the nut and screw members.

The preferred embodiment of my invention comprises in combination a davit pivoted at its lower end to swing in a vertical plane, means for swinging the same comprising a screw member and a nut member threaded on said screw, one of said members being connected to the davit intermediate the ends thereof, and one of such members being rotatable and the other non-rotatable, telescopic tubes inclosing the screw during actuation in both directions and forming cylindrical elongated bearings for said screw and nut; a frame or deck stool fixed to the deck of a vessel having bearings, a shaft journaled in said frame or deck stool to have rotary movement only, means for rotating said shaft and a universal joint connection between the end of one of said screw and nut members with said shaft.

In the accompanying drawings in which similar reference characters designate corresponding parts throughout the several views, Figure 1 is a side elevation of a device embodying my invention, a part of the lifeboat being broken away; Fig. 2 is a longitudinal section of the davit and actuating mechanism, the upper and lower ends of the davit and deck frame being broken away; Fig. 2ª is a detail of the connection between the crank shaft and swinging mechanism illustrated in Figs. 1 and 2; Fig. 3 is a section on the line 3—3 of Fig. 1; Fig. 4 is a side elevation of a modified form of my invention; Fig. 5 is a longitudinal enlarged section of the actuating device shown in Fig. 4; Figs. 6, 7, 8 and 9 are still further modified forms of such actuating devices.

Referring now to these drawings 1 indicates a boat which it is desired to raise and lower from the deck of a vessel 2.

3 indicates a davit which may be of any suitable design or configuration and as illustrated terminates at its lower end in a foot piece comprising knuckles 4—4 forming pivot bearings and which straddle a pivot bracket 5, a pivot pin 6 extending through both knuckles and the pivot bearing bracket. The said davit arm is also provided with suitable means such as the falls 7 for suspending a boat from its upper ends and a securing cleat 8.

Referring now particularly to Figs. 1, 2, 3 and 4, 9 indicates a pivot bearing bracket connected as shown to the davit intermediate its ends and preferably cast integrally therewith, and 10 designates a crank shaft journaled to have rotary movement only in a bearing 11 mounted at the upper end of a bearing frame or deck stool 12 suitably fixed to the deck of the vessel, and between such pivot bracket 9 and crank shaft 10 I provide intermeshing screw and nut members, the nut member 13 as shown comprising a cylinder or tube with which is associated at one end a nut 14, which meshes with a screw 15 connected to the actuating shaft 10 and being, as illustrated, entirely inclosed within a tube 16 connected thereto as shown by means of head 17 and pin 18, thus revolving with said screw and closely fitting over the tubular member 13 having the nut 14. The head 17 is connected to the shaft 10 by means of a universal joint which as shown is formed by bifurcating the head as shown at $17^a$—$17^a$ and bifurcating the contiguous end of the shaft as shown at $10^a$—$10^a$, and pivoting such bifurcated portions to an intermediate block 19. The crank shaft 10 may be provided with thrust washers 20 which extend into grease reservoirs 21—21 filled by means of an oil cup 22. A crank shaft 23 is fitted to the end of the crank shaft 10. Obviously upon rotation of the crank shaft 10 in opposite directions, the screw 15 will also be rotated and the nut will be compelled to travel outwardly or inwardly according to the direction of rotation. The tube 16 will also rotate and move backwardly and forwardly with the screw and by reason of its close association with the tube 13 connected to the nut will form a guide member to always retain the screw and nut in proper horizontal relation, thus taking up from the screw and nut all bearing strains or stresses, forming an inclosing envelop for the screw at all times during the actuation of the device and furthermore retaining the lubricant free from dust and the drying action of the air.

In Figs. 4 and 5 I have illustrated a slightly modified form of construction in which the crank shaft and accompanying parts are omitted, a head $17^b$ being pivoted directly to bracket 24 secured to the side of a cabin, bulkhead or other superstructure 25, a pilot wheel 26 being fixed to a nut member $13^a$ swiveled to the bracket 24 by means of a swivel piece 27, the nut member $13^a$ carrying a nut $14^a$ intermeshing with the screw $15^a$ connected to the davit, the outer tube $16^a$ being connected to the screw member and forming a bearing with the nut member $13^a$ substantially as above described.

In Figs. 6 and 8 I have shown two positions of a device in which two tubes $13^b$—$13^b$ have nuts $14^b$—$14^b$ intermeshing with an intermediate screw member $15^b$ having right and left hand threaded portions projecting at opposite sides of its center, and to said screw member is connected a guiding and bearing tube $16^b$, the guiding and bearing tube and screw member being rotated by means of a pilot wheel 26.

In Fig. 7 I have shown a construction in which the intermediate member comprises a tube $13^c$ having nuts $14^c$—$14^c$ at opposite ends and adapted to be rotated by means of a pilot wheel 26, the nuts $14^c$—$14^c$ intermeshing with screws $15^c$—$15^c$, one of which screws is connected to the davit and the other to the deck of the vessel. Bearing and guiding members $16^c$—$16^c$ fit over the opposite ends of the nut member and inclose the screws during actuation.

In Fig. 9 I have shown another slightly modified form of device in all respects similar to Fig. 8 except that a bearing bushing 27 is inserted between the outer screw guiding member and the interior nut member.

Having described my invention, I claim:

1. The combination with a davit pivoted to swing in a vertical plane, of a device for actuating the same to swing embodying a screw and a nut having threaded engagement on the screw, one end of such device being connected to the davit intermediate its ends and the other connected to the vessel, telescoping tubes associated with the screw and nut and inclosing the screw during actuation in both directions and forming a guiding and bearing surface therefor and means for revolving one of said members to swing the davit.

2. The combination with a davit pivoted to swing in a vertical plane, of a member provided with a screw and another member having a nut threaded on said screw, one of such members being connected to the davit intermediate its ends and the other connected to the vessel, and one of such members being rotatable and the other non-rotatable, of telescoping tubes inclosing the screw during actuation and forming guiding and bearing surfaces therefor, the outer tube being connected to the screw member, and means for revolving the rotatable member to swing the davit.

3. The combination with a davit pivoted to swing in a vertical plane, means for swinging said davit comprising a member provided with a screw and another member having a nut threaded on said screw, one of such members being rotatable and the other non-rotatable and one of the same pivotally connected to the davit, a fixed bearing on the vessel, a shaft mounted in said bearing to have rotary movement only and a joint between one of the aforesaid members and said shaft adapted to permit movement transverse the axis of said shaft in two intersecting planes and means for rotating said shaft to swing the davit.

4. The combination with a davit pivoted to swing in a vertical plane, means for swinging said davit comprising a member provided with a screw and another member having a nut threaded on said screw, one of such members being rotatable and the other non-rotatable and one of the same connected to the davit; a deck stool fixed to the deck of the vessel having a fixed bearing, a shaft journaled in said bearing to have rotary movement only, and a universal joint connection between one of such members and said shaft, and means for rotating said shaft.

5. The combination with a davit pivoted to swing in a vertical plane, of a member provided with a screw and another member having a nut threaded on said screw, one of such members being connected to the davit intermediate its ends and the other connected to the vessel, and one of such members being rotatable and the other non-rotatable, of telescoping tubes associated with the screw and nut and inclosing the screw during actuation and forming guiding and bearing surfaces therefor, the outer tube being connected to the screw member; a deck stool fixed to the deck of the vessel having a fixed bearing, a shaft journaled in said bearing to have rotary movement only and a universal joint connection between one of said members and said shaft and means for rotating said shaft.

In witness whereof, I have signed my name to the foregoing specification in the presence of two subscribing witnesses.

HARRY W. BROADY.

Witnesses:
FREDERICK P. RANDOLPH,
HELEN V. HOLMES.

Copies of this patent may be obtained for five cents each, by addressing the "Commissioner of Patents, Washington, D. C."